P. S. BAILEY.
UNIVERSAL JOINT AND SHOCK ABSORBING SPRINGS FOR HEADLIGHTS.
APPLICATION FILED NOV. 24, 1920.
1,379,510.
Patented May 24, 1921.
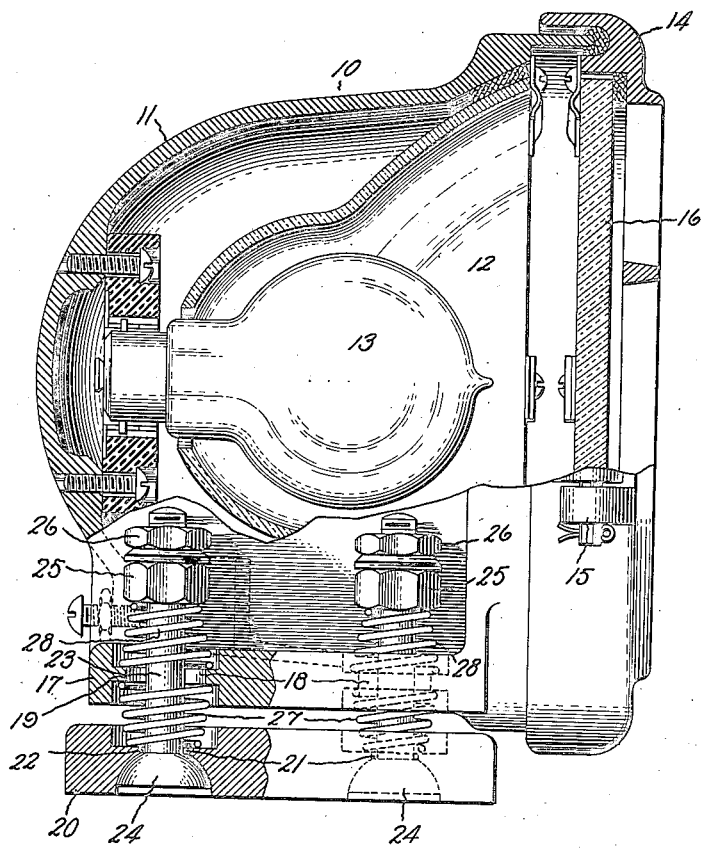
Inventor:
Percy S. Bailey,
by  *[signature]*
His Attorney.

UNITED STATES PATENT OFFICE.

PERCY S. BAILEY, OF LYNN, MASSACHUSETTS, ASSIGNOR TO GENERAL ELECTRIC COMPANY, A CORPORATION OF NEW YORK.

UNIVERSAL JOINT AND SHOCK-ABSORBING SPRINGS FOR HEADLIGHTS.

1,379,510.　　　　　Specification of Letters Patent.　　Patented May 24, 1921.

Application filed November 24, 1920. Serial No. 426,163.

*To all whom it may concern:*

Be it known that I, PERCY S. BAILEY, a citizen of the United States, residing at Lynn, in the county of Essex, State of Massachusetts, have invented certain new and useful Improvements in Universal Joints and Shock-Absorbing Springs for Headlights, of which the following is a specification.

My invention relates to improvements in shock absorbing supports. More specifically, it relates to supports for headlights which are subjected to considerable jarring, such as headlights on mining locomotives, and the like, which operate over rough road beds and which frequently strike against the cars when couplings are made. To overcome the difficulties incident to such jarring, I provide a shock absorbing support which resiliently supports the headlight, or other device, and is capable of a universal movement, to absorb shocks from any direction.

My invention will be better understood from the following description taken in connection with the accompanying drawing and its scope will be pointed out in the appended claims.

In the accompanying drawing illustrating one form of my invention in connection with a headlight, the figure is a side elevation partly in section.

Referring to the drawing in which the numeral 10 indicates a headlight having a housing or frame 11, in which is suitably mounted a reflector 12 and a source of light 13, which I have shown as an incandescent lamp. The housing 11 is closed at its open end by a door 14 suitably hinged at 15, and having a window 16. The lower part of the housing 11 forms a supporting platform 17, which is provided with a suitable number of openings 18, preferably four, in rectangular relation, but two of these openings are indicated in the drawing. The openings 18 each are provided with an internal flange 19 or other suitable shoulder, preferably located midway in said openings in order to form spring seats on both surfaces of the platform 17, as will appear hereinafter.

A base 20 spaced from the platform 17 is provided with a suitable number of openings 21 coinciding with the openings 19. The openings 21 are each provided with an internal flange 22, which forms a flat shoulder on its upper surface to serve as a spring seat and is hemispherical on its lower surface to form a socket as shown in the figure. The platform 17 and base 20 are united by bolts 23 which pass through the openings 21 and 19. These bolts are of smaller diameter than the openings through which they extend in order to permit a relative lateral movement between the base 20 and the headlight 10. The bolts 23 are provided at one end with hemispherical shaped heads 24 arranged to fit into the sockets formed by the respective flanges 22. At their opposite ends, the bolts 23 are threaded to receive nuts 25 which are secured by lock nuts 26. The base 20 and member 17 are separated by suitable compression springs 27 which surround the bolts 23. These springs are seated on the respective flanges 22 and bear against the lower surface of the respective flanges 19 at their upper ends, as shown. Suitable compression springs 28, which surround the respective bolts 23, are interposed between the nuts 25 and the platform 17 and are seated on the respective flanges 19. It will therefore be seen that the headlight 10 is cushioned between the springs 27 and 28. While I have shown these springs as spiral in form, they could be helical or any other suitable form.

When an unusual shock is sustained, the bolts 23 will give in whatever direction the inertia of the headlight carries them, due to the ball and socket arrangement of the bolts in the base 20 and due to the openings 19 and 21 being larger than the bolts. The movement of the bolts is retarded however by the springs 27 and 28, thus breaking the shock in a manner readily understood, which springs return the headlight to its normal position after the force of the shock has spent itself.

While I have described my invention as embodied in concrete form in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A shock absorbing support comprising a base, a supporting member, spherically headed bolts loosely connecting said base and said supporting member to permit of a relative lateral movement, springs on said bolts located on both sides of said supporting member arranged to cushion said member therebetween, and sockets on said base arranged to receive said spherically headed bolts, and thereby permit said bolts to move universally.

2. A shock absorbing support comprising a base provided with openings, a supporting member having openings, bolts having spherical heads loosely extending through said openings thereby uniting the base and supporting member, spring seats on the upper and lower surfaces of the supporting member concentric with the openings thereof, spring seats on the upper surface of the base concentric with the openings thereof, springs arranged on the bolts between the base and supporting member, springs on the bolts arranged between the supporting member and the nuts on said bolts, and sockets on the lower side of the base, concentric with the openings therein arranged to receive said spherical headed bolts.

3. The combination with a headlight having a supporting platform, of a shock absorbing support comprising a base, spherically headed bolts connecting said base and supporting wall arranged to permit relative lateral movement between these parts, springs on said bolts located on both sides of the supporting platform arranged to cushion said platform therebetween, and sockets in said base arranged to receive said spherically headed bolts and thereby permit said bolts to move universally.

In witness whereof, I have hereunto set my hand this 18th day of November, 1920.

PERCY S. BAILEY.